United States Patent
Benfold et al.

(10) Patent No.: US 11,847,750 B2
(45) Date of Patent: Dec. 19, 2023

(54) SMOOTH OBJECT CORRECTION FOR AUGMENTED REALITY DEVICES

(71) Applicant: Niantic, Inc., San Francisco, CA (US)

(72) Inventors: Ben Benfold, Oxford (GB); Victor Adrian Prisacariu, Oxford (GB)

(73) Assignee: NIANTIC, INC., San Francisco, CA (US)

( * ) Notice: Subject to any disclaimer, the term of this patent is extended or adjusted under 35 U.S.C. 154(b) by 0 days.

(21) Appl. No.: 17/747,775

(22) Filed: May 18, 2022

(65) Prior Publication Data

US 2023/0377278 A1 Nov. 23, 2023

(51) Int. Cl.
*G06T 19/00* (2011.01)
*G06T 19/20* (2011.01)
*G06F 3/01* (2006.01)

(52) U.S. Cl.
CPC ............ *G06T 19/006* (2013.01); *G06F 3/013* (2013.01); *G06T 19/20* (2013.01); *G06F 3/012* (2013.01); *G06T 2219/2016* (2013.01)

(58) Field of Classification Search
CPC .................. G06T 19/006; G06T 19/20; G06T 2219/2004; G06T 2219/2016; G06F 3/013; G06F 3/012
See application file for complete search history.

(56) References Cited

U.S. PATENT DOCUMENTS 9,588,593 B2 * 3/2017 Li .......................... G06T 3/0093
11,538,259 B2 * 12/2022 Martin .................. B60W 40/08
2018/0342103 A1 * 11/2018 Schwarz ............. G06F 3/04845
2019/0362564 A1 11/2019 Shen et al.
2021/0333121 A1 10/2021 Pestov
2021/0383673 A1 12/2021 Croxford et al.
2022/0138467 A1 5/2022 Eastman

FOREIGN PATENT DOCUMENTS

CN 114187509 A 3/2022

OTHER PUBLICATIONS

PCT International Search Report and Written Opinion, PCT Application No. PCT/IB2023/055136, dated Sep. 5, 2023, 10 pages.

* cited by examiner

Primary Examiner — Chong Wu
(74) Attorney, Agent, or Firm — FENWICK & WEST LLP

(57) ABSTRACT

An augmented reality ("AR") device applies smooth correction methods to correct the location of the virtual objects presented to a user. The AR device may apply an angular threshold to determine whether a virtual object can be moved from an original location to a target location. An angular threshold is a maximum angle by which a line from the AR device to the virtual object can change within a timestep. Similarly, the AR device may apply a motion threshold, which is a maximum on the distance that a virtual object's location can be corrected based on the motion of the virtual object. Furthermore, the AR device may apply a pixel threshold to the correction of the virtual object's location. A pixel threshold is a maximum on the distance that a pixel projection of the virtual object can change based on the virtual object's change in location.

40 Claims, 8 Drawing Sheets

SMOOTH OBJECT CORRECTION FOR AUGMENTED REALITY DEVICES

BACKGROUND

Augmented reality ("AR") devices display virtual objects to users in a display that overlays the virtual objects on the real world. For example, an AR device may display image data to a user that shows the real-world environment around the user, but with a virtual object that is sitting on a real-world table. Augmented reality is typically a more complicated technical task than full virtual reality (where the entire image displayed to a user is virtual) because virtual objects must be integrated into the real world for the virtual objects to "feel" real to the user. For example, AR devices may have to capture sensor data of the environment around the user and how to display a virtual object such that the virtual object appears to be an actual object in the real world.

There can be numerous challenges to displaying virtual objects in AR. For example, a virtual object may be displayed such that it appears to be in an incorrect location from where it was intended to appear to be. For example, the AR device may have inaccurate or imprecise location data describing its location relative to objects in the AR device's environment or orientation data describing the AR device's orientation within its environment. This may cause the AR device to improperly display a virtual object. Similarly, the AR device may receive inaccurate or imprecise sensor data describing the AR device's environment, and thus may display a virtual object based on inaccurate estimations of where other objects are within the environment.

An AR device can update how a virtual object is displayed based on updated data received by the AR device. However, if a virtual object's location is updated to be in a dramatically different location, the user may notice that the virtual object's location is being updated. For example, conventional methods of updating a virtual object's location may cause a virtual object to suddenly appear in the correct location or moves quickly or unnaturally to their correct location. These methods often cause a user to notice when a virtual object's location is being updated, and thus conventional correction methods cause users to lose immersion within the experience of the AR device.

SUMMARY

The AR device disclosed herein may improve on conventional object location correction methods by applying an angular threshold when correcting the target location of a virtual object. The target location of a virtual object is a location within the real world where the AR device targets the virtual object to appear to be when displayed to the user. However, as noted above, the actual, appeared location of the virtual object may differ from the target location when the AR device displays the virtual object to the user. The AR device may determine if the location of the virtual object is different from the target location and may correct the location of the virtual object.

The AR device may determine whether the target location is within an angular threshold of the virtual object's original location. An angular threshold is a maximum on the angle between the AR device's sight line to a virtual object's location and the AR device's sightline to the virtual object's updated location. If the target location is within the angular threshold, the virtual object's location is updated to the target location. If the target location is outside the angular threshold, the virtual object's location is updated to one that is closest to the target location while not exceeding the angular threshold.

Additionally, the AR device may apply a motion threshold when correcting a virtual object's location. A virtual object may be displayed to a user such that the virtual object appears to be moving with respect to the AR device. A motion threshold is a maximum distance that the location of a virtual object may be adjusted based on the motion of the virtual object. For example, the motion threshold may allow a virtual object's location to be adjusted up to some proportion of the distance that the virtual object travels in a timestep. If the target location for a virtual object is within the motion threshold of the virtual object's original location, then the virtual object's location is updated to the target location. If the target location is outside the motion threshold, the virtual object's location may be updated to a location that is closest to the target location while not exceeding the motion threshold. The AR device also may, when moving the virtual object, move the virtual object to the next step in its motion based on the virtual object's updated location, rather than its original location.

Furthermore, the AR device may apply a pixel threshold when correcting the location of a virtual object. A pixel threshold limits the distance that a virtual object's location can be corrected placing a maximum on the distance, in pixels, that the virtual object's pixel projection can be adjusted. For example, the AR device may compare a 2D pixel projection of the virtual object at the virtual object's location to a 2D pixel projection of the virtual object at the target location. If the distance between the pixel projections does not exceed the pixel threshold, then the AR device may update the virtual object's location to the target location. If the distance between the pixel projections does exceed the pixel threshold, then the AR device may update the virtual object's location to the closest location to the target location that does not exceed the pixel threshold.

By using an angular threshold, the AR device may allow depth-wise corrections of a virtual object's location more than lateral corrections of the virtual object's location. Thus, the AR device allows corrections that may be less noticeable to a user, which places virtual objects as close to the correct location as possible while retaining a desired degree of immersion or believability for the user. Similarly, by limiting how much the virtual object's location can be adjusted based on a motion threshold, the user may dismiss any adjustments in a virtual object's location as part of the virtual object's intended motion, rather than a correction in the virtual object's location. Thus, the AR device can more readily correct the location of a virtual object when the virtual object is moving more quickly because the adjustments will be less noticeable to a user. Furthermore, by limiting adjustments to the location of a virtual object based on a pixel threshold, the AR device reduces how much the pixels corresponding to the virtual object change and thus more directly makes corrections to a virtual object's location less noticeable to the user.

DETAILED DESCRIPTION

Figure 1:
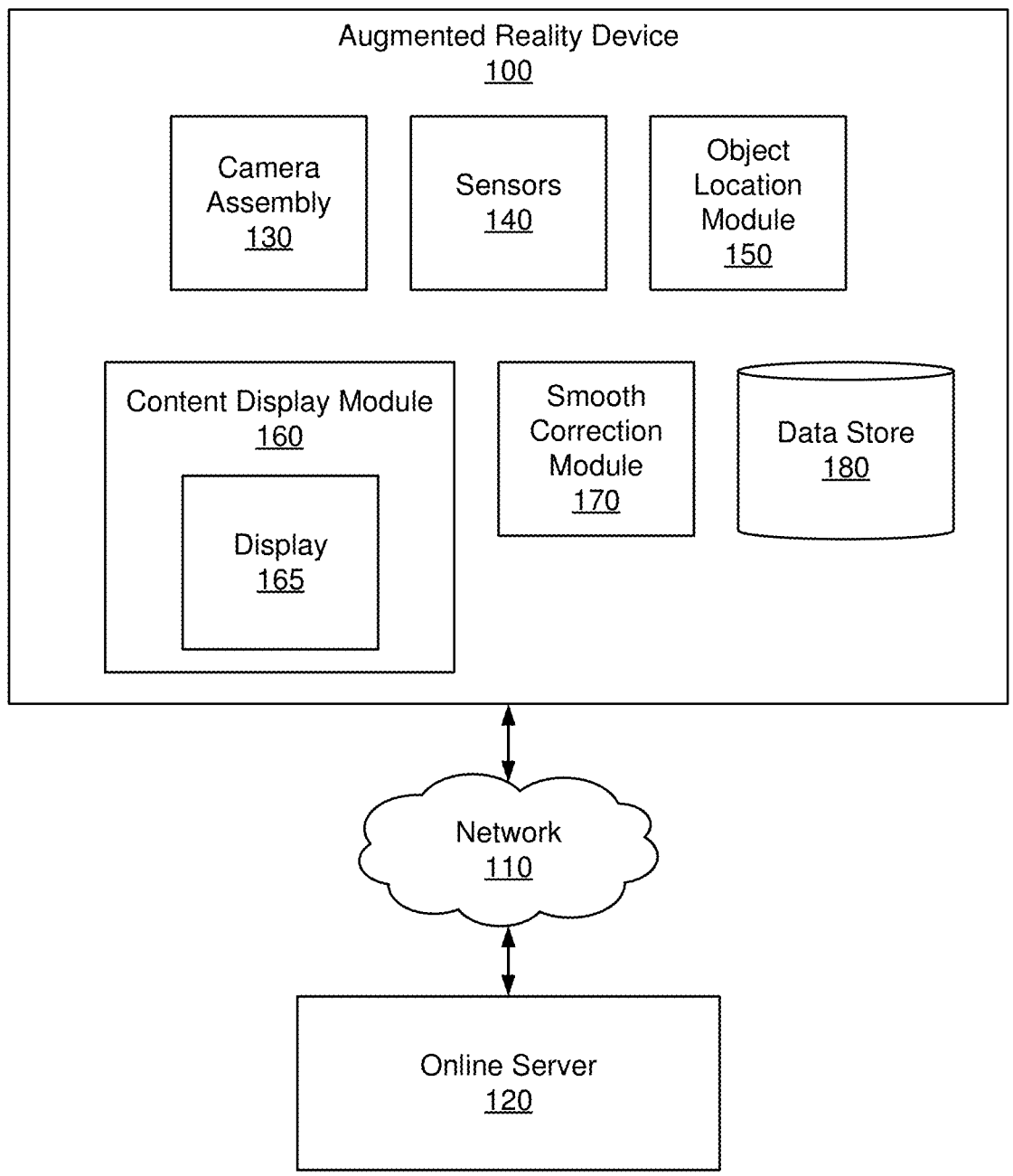
FIG. 1 illustrates a networked computing environment, in accordance with some embodiments.

FIG. 1 illustrates a system environment of an augmented reality (AR) device, in accordance with some embodiments. The system environment illustrated in FIG. 1 includes an AR device 100, a network 110, and one or more online servers 120. Alternative embodiments may include more, fewer, or different components from those illustrated in FIG. 1, and the functionality of the components may be divided between the components different from the description below. For example, some or all of the functionality of the AR device 100 may be performed by one or more online servers 120, and vice versa.

An AR device 100 can be any computing device that can be used by a user to interact with AR content presented by the AR device 100. For instance, an AR device 100 can be a wireless device, a personal digital assistant (PDA), portable gaming device, cellular phone, smart phone, tablet, navigation system, handheld GPS system, wearable computing device, a display having one or more processors, or other such device. In some embodiments, the AR device 100 includes a conventional computer system, such as a desktop or a laptop computer (e.g., a desktop computer wirelessly connected to an AR headset). Additionally, the AR device 100 may be a vehicle with a computing device. The AR device 100 can include one or more processors and one or more computer-readable storage media. The computer-readable storage media can store instructions which cause the processor to perform operations.

The AR device 100 may include various other input/output devices for receiving information from or providing information to a player. Example input/output devices include a display screen, a touch screen, a touch pad, data entry keys, speakers, and a microphone suitable for voice recognition. The AR device 100 can further include a network interface for providing communications over the network 110. A network interface can include any suitable components for interfacing with one more networks, including for example, transmitters, receivers, ports, controllers, antennas, or other suitable components.

FIG. 1 illustrates an example system architecture of an AR device 100, in accordance with some embodiments. The AR device 100 may include a camera assembly 130, one or more sensors 140, an object location module 150, a content display module 160, a smooth correction module 170, and a data store 180. In alternative embodiments, the AR device 100 may include more, fewer, or different components from those illustrated in FIG. 1, and the functionality of each component may be divided differently from that of FIG. 1.

The camera assembly 130 captures image data of the environment around the AR device 100. The camera assembly 130 may include photo sensors to capture image data of the environment. The camera assembly 130 may contain a wide-angle lens or a telephoto lens. The camera assembly 130 may be configured to capture single images or video as the image data. The camera assembly 130 may include metadata with the image data describing other details of the image data including sensory data (e.g., temperature, brightness of environment) or capture data (e.g., exposure, warmth, shutter speed, focal length, capture time, etc.). The camera assembly 130 can include one or more cameras which can capture image data. In one instance, the camera assembly 130 includes one camera and is configured to capture monocular image data. In another instance, the camera assembly 130 includes two cameras and is configured to capture stereo image data. In various other implementations, the camera assembly 130 includes multiple cameras, each configured to capture image data.

The AR device 100 includes sensors 140 that may capture measurements of the AR device 100 or the environment around the AR device 100. For example, the AR device 100 may include movement sensors, accelerometers, gyroscopes, inertial measurement units (IMUs), barometers, positioning systems, thermometers, light sensors, photo sensors (e.g., cameras), etc. The sensors 140 may capture location data describing the position of the AR device 100. The sensors 140 can determine actual or relative position of the AR device 100 by using a satellite navigation positioning system (e.g., a GPS system, a Galileo positioning system, the Global Navigation satellite system (GLONASS), the BeiDou Satellite Navigation and Positioning system), an inertial navigation system, a dead reckoning system, based on IP address, by using triangulation or proximity to cellular towers or Wi-Fi hotspots, or other suitable techniques for determining position.

The object location module 150 determines a target location for a virtual object within the real world. A virtual object is a computer-generated object that is displayed to the user. For example, a virtual object may be a computer-generated person, avatar, creature, or item. A target location of a virtual object is a location within the real world where the AR device 100 targets the object to appear to be when displayed to the user. The target location may be primarily described herein as a location that is determined relative to the AR device (i.e., where the AR device 100 serves as an origin point), but the target location also may be determined as an absolute location. In some embodiments, the target location includes a target orientation of the virtual object. Additionally, the target location may be a 2D location or a 3D location.

The object location module 150 may determine the target location for a virtual object based on content instructions. Content instructions are instructions for the presentation of content to a user by the AR device 100. For example, content instructions may include a 3D model for the AR device 100 to use to present the virtual object. Additionally, content instructions may specify where a virtual object should be located in the real world. For example, content instructions for a virtual object may specify an absolute location in the real world where the virtual object should be located or may specify a location relative to the user where the virtual object should be located. Content instructions may further specify a target location for a virtual object based on objects in the real world. For example, content instructions may specify that a virtual object should be located in the center of a table or in a window frame. In some embodiments, content instructions include motion instructions that specify how a virtual object should move. For example, motion instructions may specify a direction of motion for a virtual object and a distance that the virtual object should move within a timestep. The object location module 150 may receive content instructions from the online system 120 or from the data store 180.

The object location module 150 may determine a target location for a virtual object based on sensor data received from the sensors 140. For example, the object location module 150 may determine the location of the AR device 100 based on location data received from the sensors 140, and made determine the target location of a virtual object based on the location of the AR device 100. In some embodiments, the object location module 150 uses sensor data from the sensors 140 to identify real-world objects in the environment around the AR device 100, and may determine the target location for an object based on the identities or locations of those real-world objects. For example, the object location module 150 may identify a table and the table's location, and may determine a target location for a virtual object being in the center of the top of the table.

The content display module 160 displays content to the user. The content display module 160 may include a display 165 that displays content to a user. A display 165 is a device that is capable of projecting a 2D array of pixels to a user. For example, the display 165 may include a flat display (e.g., an LCD screen, an OLED screen, or a flat touch screen) or may display content to a user through one or more lenses of a headset configured to project light into one or both eyes of a user such that the user views the real-world environment through the lenses with one or more virtual objects overlaid on the user's view of the real-world environment. The content display module 160 may display image data to the user through the display 165. For example, the content display module 160 may display image data captured by the camera assembly 130 and display the image data to the user through the display 165.

The content display module 160 displays virtual objects to a user. The content display module 160 may generate a 2D projection of a 3D model of the virtual object to display the virtual object to a user through the display 165. The content display module 160 may generate the 2D projection of the virtual object to make the object appear to the user to be at the target location of the virtual object. For example, the content display module 160 may adjust the size, orientation, or placement of the virtual object's 2D projection in the display 165 to make the virtual object appear to be located at the target location. The content display module 160 may additionally use sensor data from the AR device 100 to adjust the 2D projection of the virtual object. For example, the content display module 160 may receive location data describing a location of the AR device 100 and may adjust the size of the 2D projection of the virtual object such that the virtual object appears the correct distance away from the AR device 100 for the virtual object's target location. Similarly, the content display module 160 may receive orientation data describing the orientation of the AR device 100 and may adjust the location of the 2D projection of the virtual object such that the virtual object appears to be located at the target location for the virtual object.

The smooth correction module 170 detects whether a virtual object is being correctly displayed as being at the target location and corrects the location of a virtual object if the virtual object is not displayed correctly. For example, as the AR device 100 collects more data (e.g., from the sensors 140), the smooth correction module 170 may determine that the virtual object's location is incorrect and needs to be updated. Similarly, the smooth correction module 170 may determine that the virtual object was displayed to the user based on an inaccurate estimate for the location for the AR device 100 and that the virtual object needs to be displayed differently for the virtual object to appear to be located in the target location. While the smooth correction module 170 is depicted herein as a separate module from the object location module 150, in alternative embodiments, the smooth correction module 170 is part of the object location module 150.

The smooth correction module 170 may smoothly correct the display of a virtual object when the virtual object's displayed location does not correspond to the target location for the virtual object. For example, when the AR device 100 receives sensor data from the sensors 140, the smooth correction module 170 may determine an original displayed location for the virtual object. The original displayed location of the virtual object is a location in the real world where the virtual object was originally displayed. The smooth correction module 170 may determine that the original location of the virtual object does not correspond to the target location of the virtual object and update the display of the virtual object such that the virtual object appears to be located at an updated location in the real world.

The smooth correction module 170 may continually update the displayed location for a virtual object. For example, the smooth correction module 170 may update display of a virtual object based on updated sensor data from the sensors 140 or based on new content instructions to be executed for the virtual object. In some embodiments, the smooth correction module 170 regularly updates the target location for a virtual object based on a timestep. A timestep is a time interval that the AR device 100 uses for the frequency at which the smooth correction module 150 updates display of the virtual object. For example, the timestep may be based on the refresh rate of the display. The AR device 100 may adjust the timestep. For example, the AR device 100 may shorten the timestep when the virtual object is moving or may lengthen the timestep when the virtual object is relatively still.

Methods for smoothly correcting the display of a virtual object are discussed in detail below. For simplicity, these methods for smoothly correcting the display of a virtual object may primarily be described in the context of updating a location of a virtual object from the reference frame of a non-moving AR device 100. However, the methods described herein may be applied to smoothly update the display of a virtual object based on an updated target location for a virtual object or an updated location of the AR device 100.

Figure 2:
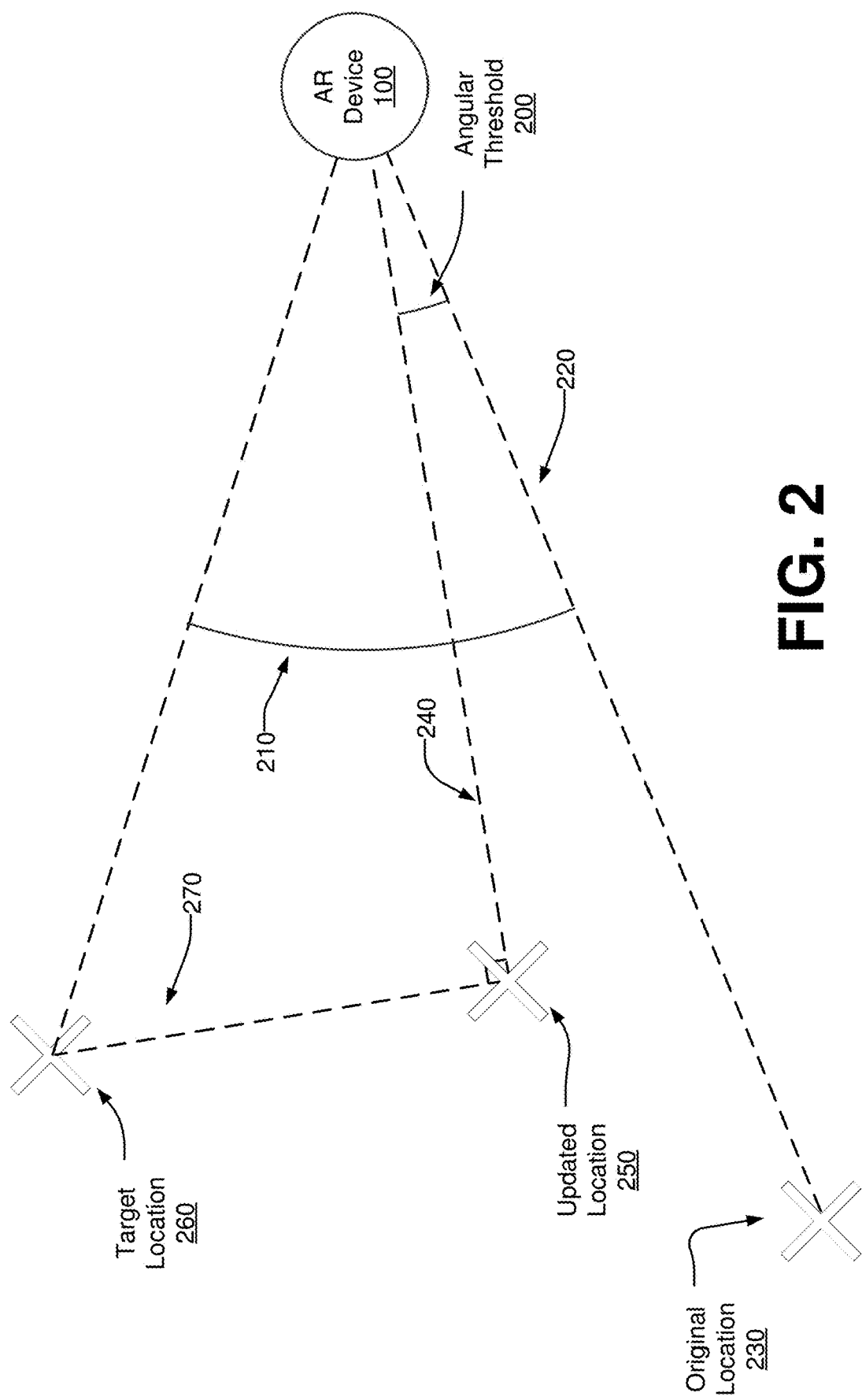
FIG. 2 illustrates a virtual object's location being updated based on an angular threshold, in accordance with some embodiments.

In some embodiments, the smooth correction module 170 updates the location of a virtual object based on an angular threshold. FIG. 2 illustrates a virtual object's location being updated based on an angular threshold, in accordance with some embodiments. An angular threshold 200 is a maximum on the angle between: (1) the sight line 220 from the AR device 100 to a virtual object's original location 230; and (2) the sight line 240 from the AR device 100 to the virtual object's updated location 250. For example, if the angle 210 between the sight lines from the AR device 100 to a virtual object's original location 230 and target location 260 is 30 degrees, and the angular threshold 200 is 15 degrees, the smooth correction module 170 may update the displayed location of the virtual object to a location 250 in the real world between the original location 230 and the target location 260 such that the angle between the original location 230 and the updated location 250 does not exceed 15 degrees. However, if the target location 260 is 10 degrees away from the original location 230, then the smooth correction module 170 may display the virtual object at the target location 260, because the target location 260 is within the angular threshold of the original location 230.

The smooth correction module 170 may select, as the updated location 250, a location that is closest to the target location 260 without exceeding the angular threshold 200. For example, the smooth correction module 170 may use a Euclidean distance to select an updated location 250 that is closest to the target location 260. In some embodiments, the smooth correction module 170 selects the updated location 250 based on locations that lie along the sight line 240 that corresponds to the angular threshold 200. The smooth correction module 170 may select the location along that sight line 240 that is closest to the target location 260 as the updated location 250. The smooth correction module 170 may consider a set of locations along that sight line 240 and select the location that is closest to the target location 260.

The smooth correction module 170 also may use trigonometry to identify the closest location 250 to the target location 260. Since the updated location 250 is the closest point to the target location 260 along that sight light, the line 270 from the target location 260 to the updated location 250 intersects the sight line 240 that corresponds to the angular threshold 200 at a right angle. Thus, the smooth correction module 170 may use trigonometry to identify the updated location 250 based on the angular threshold 200, the original location 230, and the target location 260. Similarly, the smooth correction module 170 may identify the updated location 250 by calculating the parameters (e.g., slope and intercept) of the sight line 240 corresponding to the angular threshold 200 and calculating the parameters of the line 270 between the target location 260 and the updated location 250 based on the slope of the sight line 240 and the target location. For example, since the line 270 from the target location 260 to the updated location 250 intersects the sight line 240 that corresponds to the angular threshold 200 at a right angle, the slope of the line 270 between the target location 260 and the updated location 250 will be the negative inverse of the slope of the sight line 240. The smooth correction module 170 may then determine the updated location 250 based on where the sight line 240 intersects the line 270 between the target location and the updated location 250.

The smooth correction module 170 may use the angular threshold 200 to determine how much a virtual object's displayed location may be updated within a timestep. For example, if the target location 260 is not within the angular threshold of the original location 230, then the smooth correction module may continually update, at each time step, the displayed location of the virtual object through a sequence of updated locations 250 until the virtual object reaches the target location 260.

Additionally, the smooth correction module 170 may continually update the target location 260 based on updated data from the sensors 140 or from the camera assembly 130. The smooth correction module 170 may determine an updated location 250 for the virtual object at each timestep based on the updated target location 130.

Figure 3:
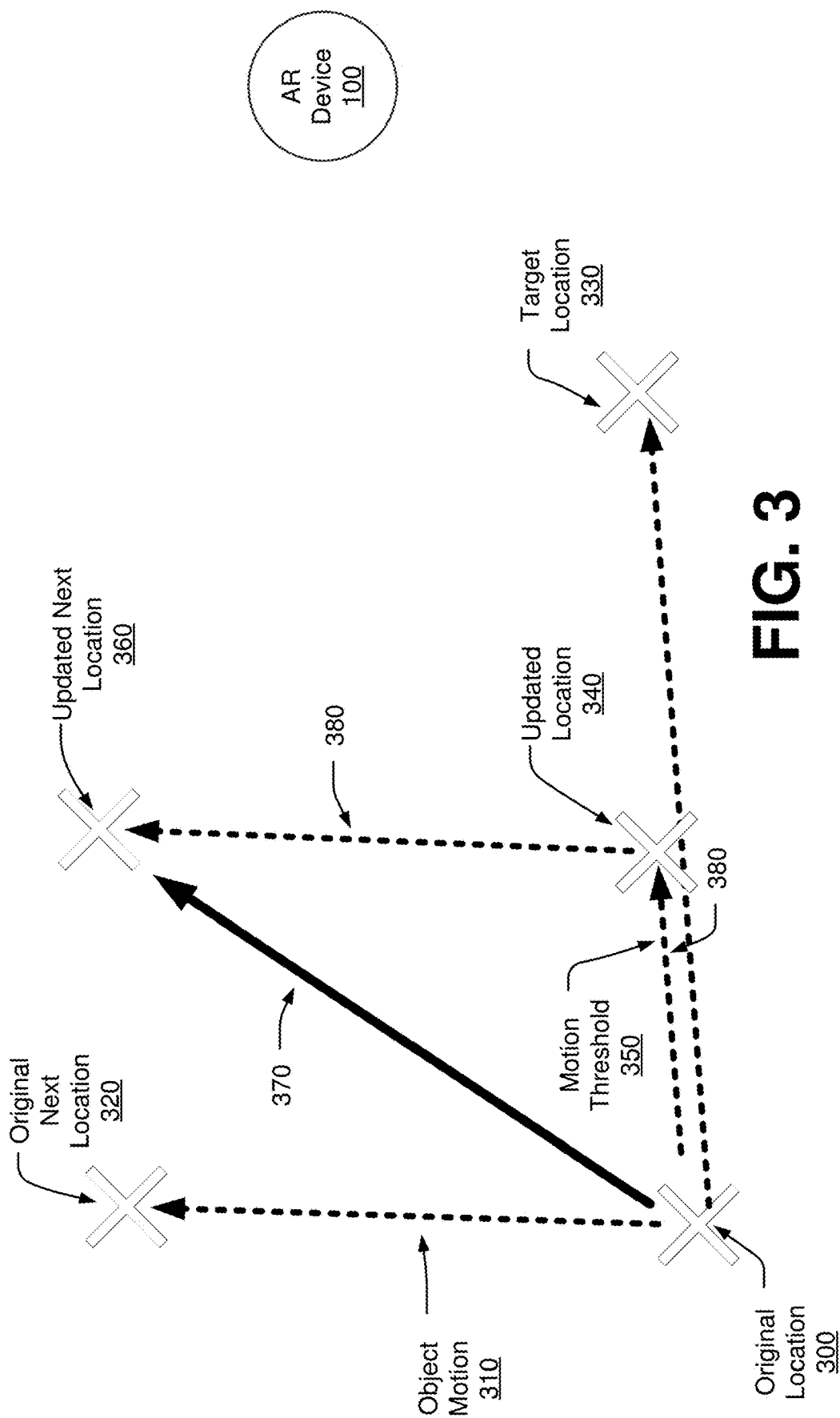
FIG. 3 illustrates a virtual object's location being updated based on a motion threshold, in accordance with some embodiments.

In some embodiments, the smooth correction module 170 updates the location of a virtual object based on a motion threshold. FIG. 3 illustrates a virtual object's location being updated based on a motion threshold, in accordance with some embodiments. The AR device 100 may determine an original location 300 for a virtual object. The AR device 100 may also determine that the virtual object should be displayed such that the virtual object moves 310 some amount within a timestep. The AR device 100 may then determine an original next location 320 for the virtual object based on the original location 300 of the virtual object and the object motion 310.

The smooth correction module 170 may determine that the original location 300 is not at the target location 330. For example, the smooth correction module 170 may determine that the AR device 100 was located at a different location from one used to determine the original location 300. The smooth correction module 170 may determine an updated location 340 for the virtual object based on a motion threshold 350. A motion threshold 350 is a maximum distance that the location of a virtual object may be adjusted based on the motion 310 of the virtual object. For example, the motion threshold 350 may be some proportion of a distance 310 that the virtual object covers within a timestep. If the target location 330 is within the motion threshold 350 of the original location 300, then the smooth correction module 170 updates the displayed location of the virtual object from the original location 300 to the target location 330. However, if the target location 330 is outside of the motion threshold 350, the smooth correction module 170 may determine an updated location 340 for the virtual object that is in the direction of the target location 330 but is within the motion threshold 350 of the original location 300 for the virtual object.

The smooth correction module 170 determines an updated next location 360 for the virtual object. The updated next location 360 is the location at which the virtual object is displayed based on the updated location 340 of the virtual object and the motion 310 of the virtual object. In some embodiments, the smooth correction module 170 updates the location of the virtual object from its original location 300 to the updated next location 360 in one step 370. Alternatively, the smooth correction module 170 may update the virtual object's location from its original location 300 to the updated next location 360 in two steps 380. In a first timestep, the smooth correction module 170 may update the virtual object's location from its original location 300 to the updated location 340, and in a second timestep, may update the virtual object's location from the update location 340 to the updated next location 360.

As noted above, while the description above primarily describes correcting a displayed location of virtual object based on the motion of the object, the smooth correction module 170 may use the motion threshold to update the location of a virtual object based on the movement of the AR device 100. For example, the smooth correction module 170 may detect that the AR device 100 is moving or is changing orientation. The smooth correction module 170 may convert these movements of the AR device 100 into movements of the virtual object relative to the AR device and may apply the motion threshold to updating the location of the virtual object as described above.

Figure 4:
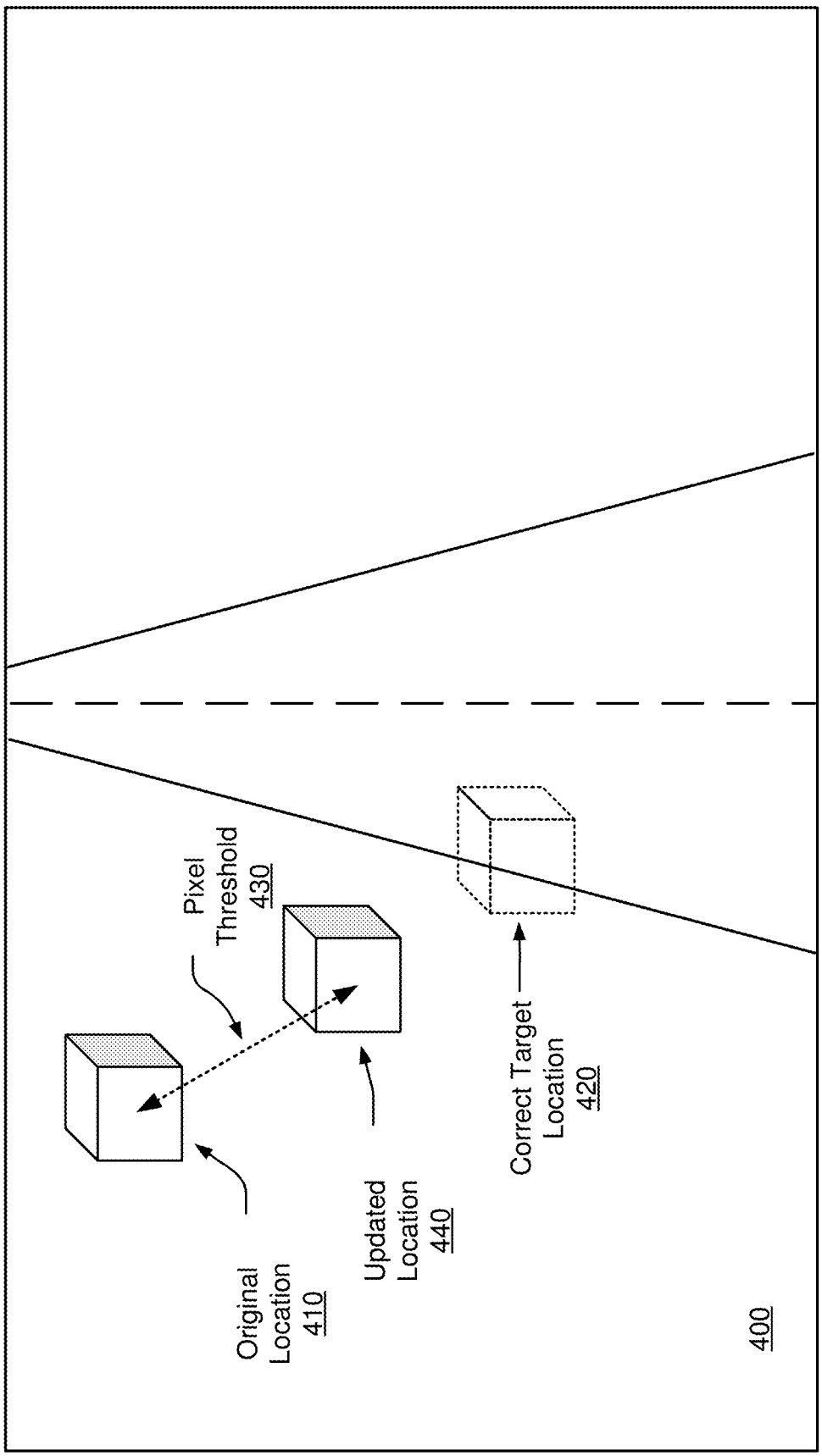
FIG. 4 illustrates a virtual object's target location being updated based on a pixel threshold, in accordance with some embodiments.

In some embodiments, the smooth correction module 170 updates a displayed location for a virtual object based on a pixel threshold. FIG. 4 illustrates a virtual object's displayed location being updated based on a pixel threshold, in accordance with some embodiments. A pixel threshold is a maximum on the number of pixels that a virtual object moves when the smooth correction module 170 updates the location of a virtual object. In FIG. 4, a virtual object was depicted in a display 400 of the AR device 100 at an original location 410. The smooth correction module 170 may determine that the original location 400 of the virtual object is not at the target location 420 for the virtual object. If the target location 420 is within the pixel threshold 430 of the original location 410, the smooth correction module 170 updates the location of the virtual object to the target location 420. If the target location 420 is outside of the pixel threshold 430 from the original location, the smooth correction module 170 may determine an updated location 440 for the virtual object that is in the direction of the target location 420 but is within the motion threshold 430 of the original location 410 for the virtual object.

To determine whether a target location 420 is within a pixel threshold 430 of the original location 410, the smooth correction module 170 may compare a pixel projection of the virtual object at the original location 410 with a pixel projection of the virtual object at the correct target location 420. These pixel projections may be pixel projections generated by a pixel projection function onto a 2D array of pixels that represent the display of the AR device 100. The smooth correction module 170 may then compare the pixels within each pixel projection to determine a distance between the pixel projections. If the distance between the pixel projection of the original location 410 and the pixel projection of the target location 420 is less than the pixel threshold 430, then the smooth correction module 170 updates the location for the virtual object to the target location 420. If the distance is not within the pixel threshold 430, then the smooth location module 170 may determine an updated location 440 between the target location 420 and the original location 410 that is within the pixel threshold 430 and has the shortest distance to the correct target location 420.

To determine the distance between pixel projections, the smooth correction module 170 may identify which pixels within each pixel projection correspond to a part of the virtual object (e.g., which pixels in each pixel projection correspond to a corner of a box), and compare the locations of the pixels in each pixel projection. The smooth correction module 170 also may compare pixels within each pixel projection that are closest to each other to determine the distance between the pixel projections. Similarly, the smooth correction module 170 may compare pixels within each pixel projection that are furthest from each other to determine the distance between the pixel projections. In some embodiments, the smooth correction module 170 identifies a center pixel of each pixel projection and compares the distance between those center pixels. For example, the smooth correction module 170 may determine a centroid of each pixel projection to identify a center pixel of a pixel projection.

In some embodiments, the pixel threshold 430 is based on a motion of the virtual object. If content instructions for a virtual object indicate that a virtual object should be depicted as moving, the smooth correction module 170 may adjust the pixel threshold 430 based on the motion of the virtual object. For example, the pixel threshold 430 may be adjusted based on some proportion of the distance the virtual object moves within a timestep. The pixel threshold 430 may be solely based on the motion of the virtual object or may have a baseline value that is increased based on the motion of the virtual object.

The data store 180 stores data used by the AR device 100 to provide an AR experience to a user. For example, the data store 180 may store content data describing content that may be presented to a user by the AR device 100. For example, the data store 180 may store 3D models for virtual objects that may be presented to the user. Additionally, the data store 180 may include content instructions for virtual objects. The data store 180 also may store image data captured by the camera assembly 130 or sensor data captured by the sensors 140.

The network 110 can be any type of communications network, such as a local area network (e.g., intranet), wide area network (e.g., Internet), or some combination thereof. The network can also include a direct connection between an AR device 100 and the game server 120. In general, communication between the game server 120 and an AR device 100 can be carried via a network interface using any type of wired or wireless connection, using a variety of communication protocols (e.g., TCP/IP, HTTP, SMTP, FTP), encodings or formats (e.g., HTML, XML, JSON), or protection schemes (e.g., VPN, secure HTTP, SSL).

The online server 120 can be any computing device and can include one or more processors and one or more computer-readable storage media. The computer-readable storage media can store instructions which cause the processor to perform operations. The online server 120 can be configured to receive requests for data from an AR device 100 (for instance via remote procedure calls (RPCs)) and to respond to those requests via the network 110. For instance, the online server 120 can encode content data in one or more data files and provide the data files to the AR device 100. In addition, the online server 120 can be configured to receive data (e.g., AR device 100 location, user actions, user input, etc.) from an AR device 100 via the network 110. The AR device 100 may periodically send data from the AR device 100 to the game server 120.

In some embodiments, the online server 120 transmits content data to the AR device 100 to present to the user. The content data may include 3D models of virtual objects and content instructions for presenting the 3D models to users. In some embodiments, the online server 120 receives location data, sensor data, image data, or input data from the AR device 100 and transmits updated content instructions to the AR device 100 based on the received data.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Figure 5:
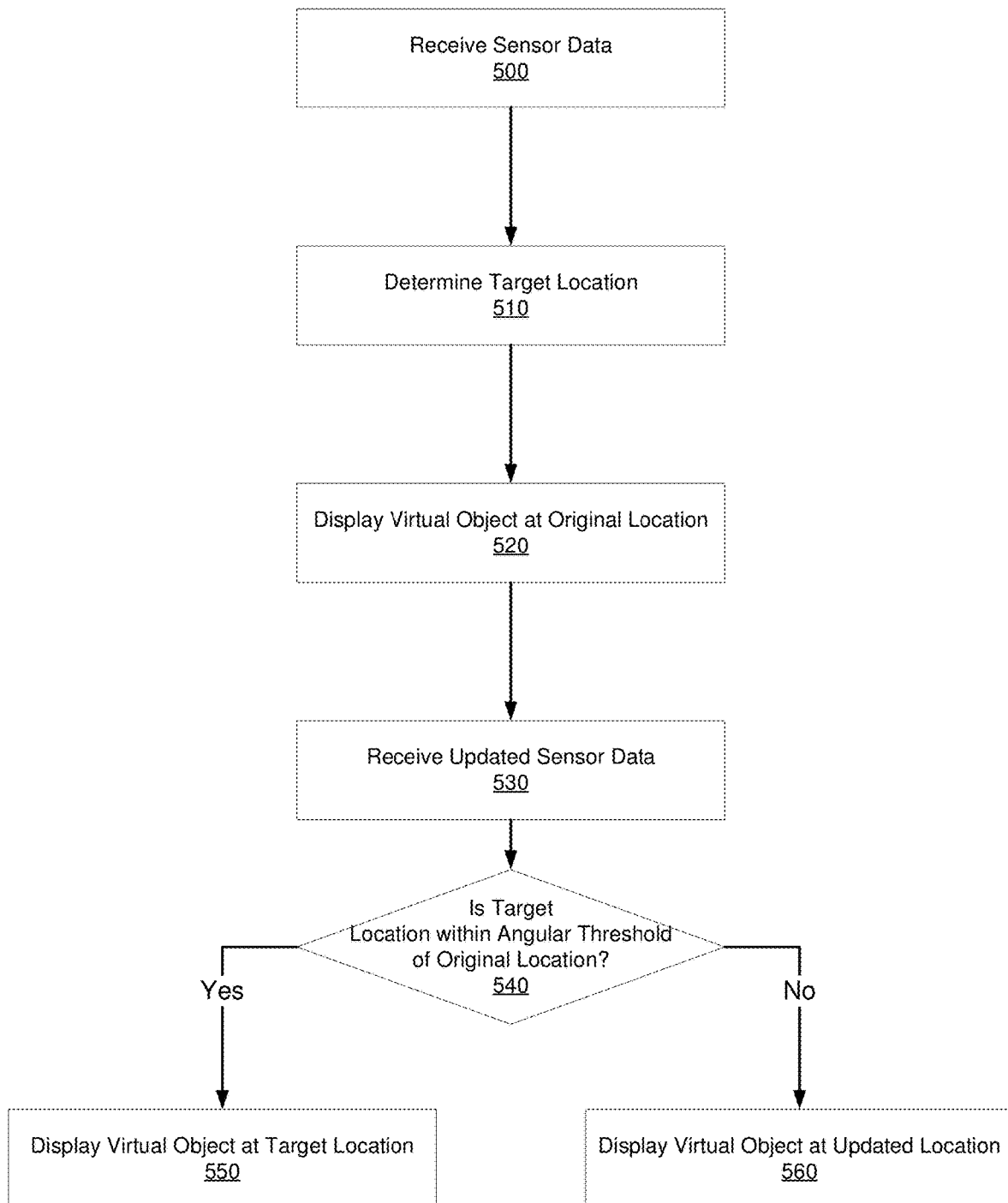
FIG. 5 is a flowchart illustrating an example method of correcting the location of a virtual object based on an angular threshold, in accordance with some embodiments.

FIG. 5 is a flowchart illustrating an example method of correcting the location of a virtual object based on an angular threshold, in accordance with some embodiments. Alternative embodiments may include more, fewer, or different steps from those illustrated in FIG. 5, and the steps may be performed in a different order from that illustrated in FIG. 5. Additionally, each of these steps may be performed automatically by an AR device or an online server with or without human intervention.

The AR device receives 500 sensor data from one or more sensors of the AR device and determines 510 a target location for a virtual object. The AR device displays 520 the virtual object at an original location based on the sensor data. The original location may be different from the target location if the received sensor data is inaccurate or out of date. The AR device receives 530 updated sensor data and may determine, based on the sensor data, that the original location is not at the target location.

The AR device determines 540 whether the target location is within an angular threshold of the original location. The angular threshold may be a maximum angle by which a line from the AR device to the virtual object may change within a timestep. If the target location is within the angular threshold of the original location, then the AR device displays 550 the virtual object at the target location. If the target location is not within the angular threshold of the original location, the AR device displays 560 the virtual object at an updated location. The updated location may be a location that is closest to the target location without being outside of the angular threshold. The AR device may update the virtual object's location to the target location or the updated location within one timestep. The AR device may continually adjust the location of the virtual object in a similar manner in subsequent timesteps.

Figure 6:
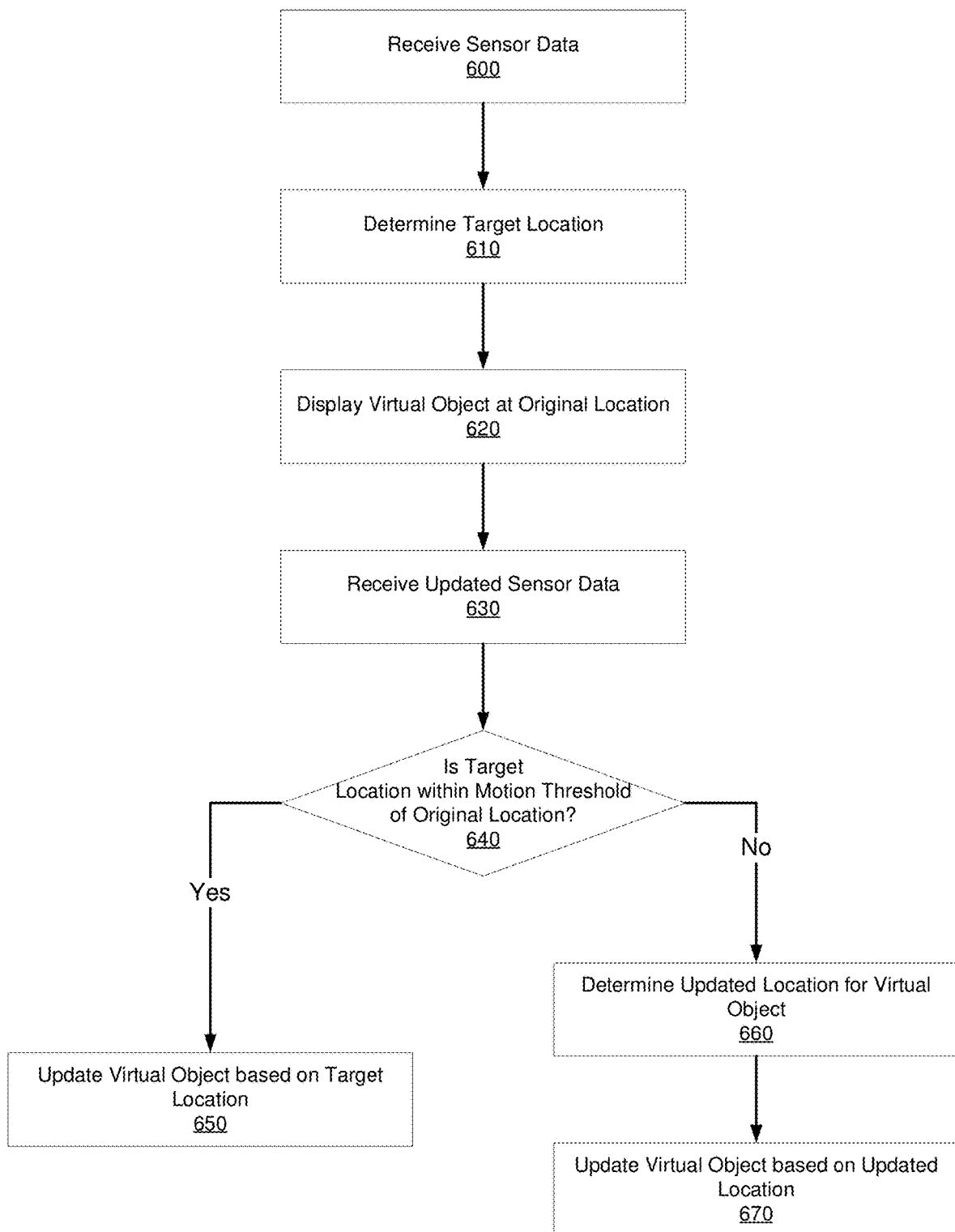
FIG. 6 is a flowchart illustrating an example method of correcting the location of a virtual object based on a motion threshold, in accordance with some embodiments.

FIG. 6 is a flowchart illustrating an example method of correcting the location of a virtual object based on a motion threshold, in accordance with some embodiments. Alternative embodiments may include more, fewer, or different steps from those illustrated in FIG. 6, and the steps may be performed in a different order from that illustrated in FIG. 6. Additionally, each of these steps may be performed automatically by an AR device or an online server with or without human intervention.

The AR device receives 600 sensor data from one or more sensors of the AR device and determines 610 a target location for a virtual object. The AR device displays 620 the virtual object at an original location based on the sensor data. The original location may be different from the target location if the received sensor data is inaccurate or out of date. The AR device receives 630 updated sensor data and may determine, based on the sensor data, that the original location is not at the target location.

The AR device determines 640 whether the target location is within a motion threshold of the original location. A motion threshold may be a maximum distance that the virtual object's location can be adjusted from the original location to the target location. The motion threshold may be based on a motion of the virtual object. If the target location is within the motion threshold of the original location, then the AR device updates 650 the virtual object based on the target location. If the target location is not within the angular threshold of the original location, the AR device determines 660 an updated location for the virtual object. The updated location may be a location that is closest to the target location without being outside of the motion threshold. The AR device updates 670 the virtual object based on the updated location.

The AR device may update the virtual object by moving the location of the virtual object to the target location or updated location in a single timestep. The AR device may then move the virtual object from the target or updated location to a next location in the course of the virtual object's motion in a subsequent timestep. The AR device also may update the virtual object by moving the location of the virtual object directly from its original location to the next location in a single timestep.

Figure 7:
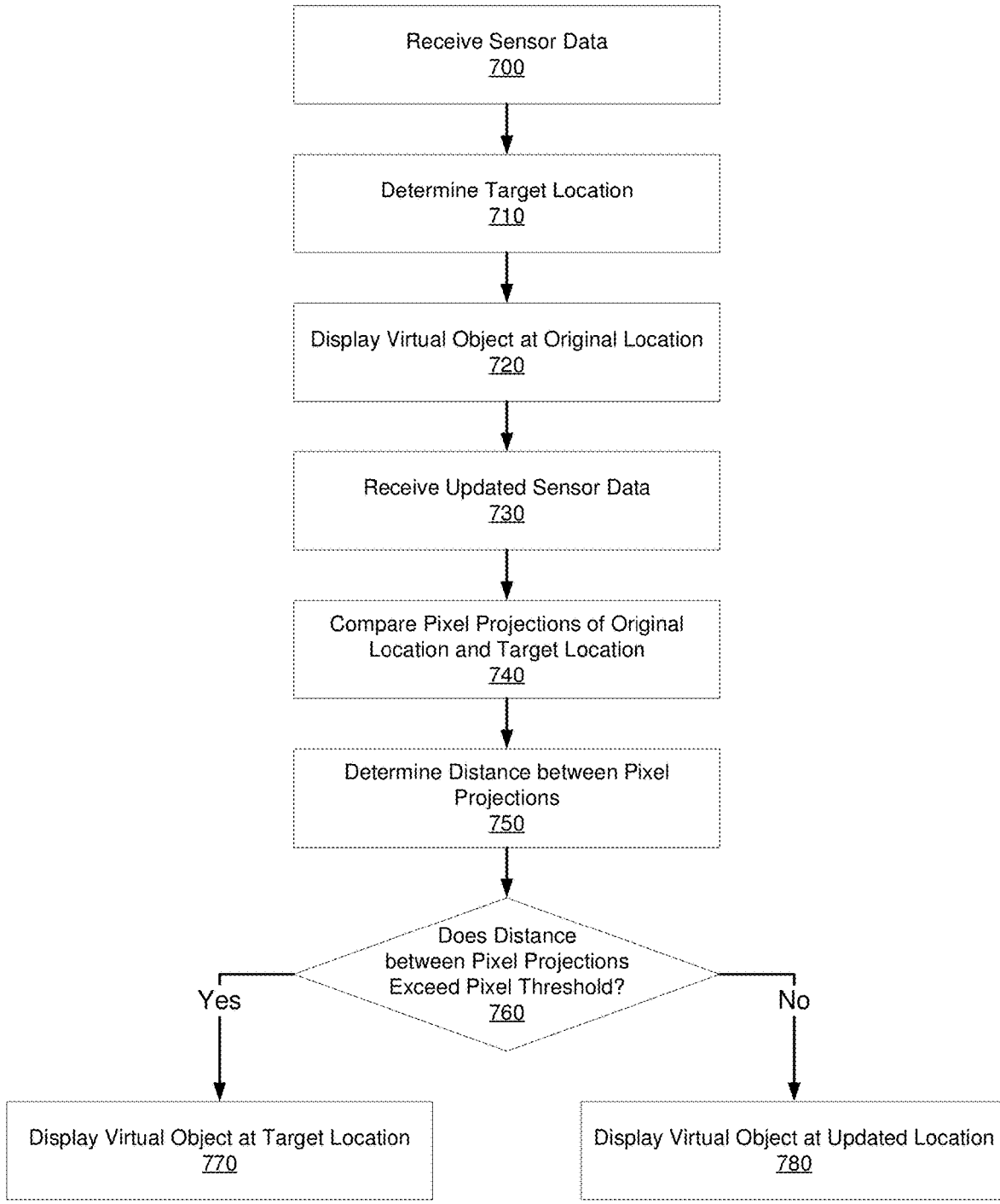
FIG. 7 is a flowchart illustrating an example method of correcting the location of a virtual object based on a pixel threshold, in accordance with some embodiments.

FIG. 7 is a flowchart illustrating an example method of correcting the location of a virtual object based on a pixel threshold, in accordance with some embodiments. Alternative embodiments may include more, fewer, or different steps from those illustrated in FIG. 7, and the steps may be performed in a different order from that illustrated in FIG. 7. Additionally, each of these steps may be performed automatically by an AR device or an online server with or without human intervention.

The AR device receives 700 sensor data from one or more sensors of the AR device and determines 710 a target location for a virtual object. The AR device displays 720 the virtual object at an original location based on the sensor data. The original location may be different from the target location if the received sensor data is inaccurate or out of date. The AR device receives 730 updated sensor data and may determine, based on the sensor data, that the original location is not at the target location.

The AR device determines whether the target location is within a pixel threshold of the original location. A pixel threshold limits the distance that a virtual object's location can be corrected placing a maximum on the distance, in pixels, that the virtual object's pixel projection can be adjusted. To determine whether the target location is within a pixel threshold of the pixel location, the AR device may compare 740 a pixel projection of the virtual object at the original location with a pixel projection of the virtual object at the target location. The AR device may determine 750 a distance between the pixel projections and may compare 760 the distance to the pixel threshold to determine whether the original location is within the pixel threshold of the target location.

If the target location is within the pixel threshold of the original location, then the AR device displays 770 the virtual object at the target location. If the target location is not within the pixel threshold of the original location, the AR device displays 780 the virtual object at an updated location. The updated location may be a location that is closest to the target location without being outside of the angular threshold. The AR device may update the virtual object's location to the target location or the updated location within one timestep. The AR device may continually adjust the location of the virtual object in a similar manner in subsequent timesteps.

Example Computing System

Figure 8:
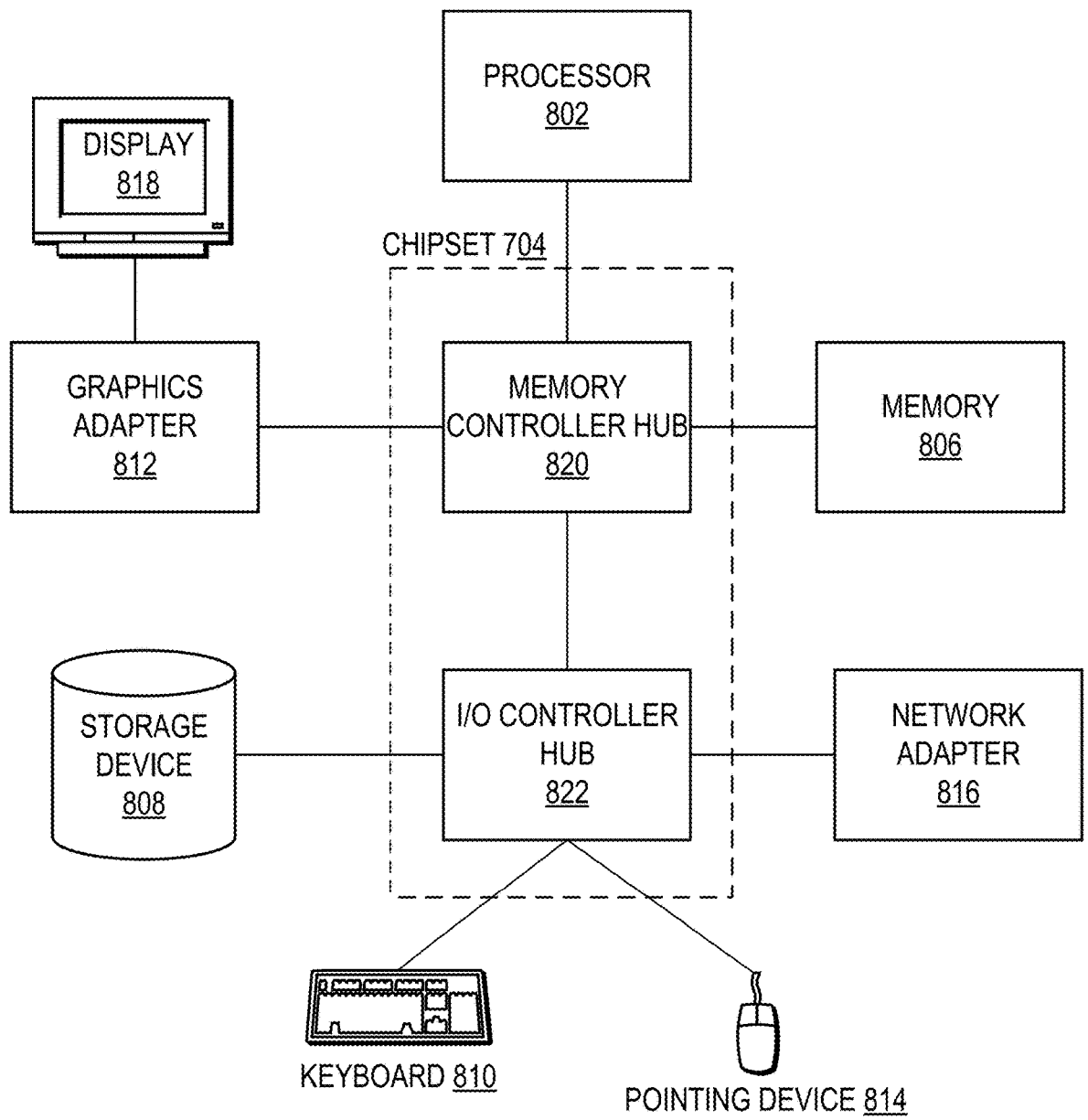
FIG. 8 is an example architecture of a computing device, in accordance with some embodiment.

FIG. 8 is an example architecture of a computing device, according to an embodiment. Although FIG. 8 depicts a high-level block diagram illustrating physical components of a computer used as part or all of one or more entities described herein, in accordance with an embodiment, a computer may have additional, less, or variations of the components provided in FIG. 8. Although FIG. 8 depicts a computer 800, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 8 are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O hub 822. In another embodiment, the memory 806 is coupled directly to the processor 802 instead of the chipset 804. In some embodiments, the computer 800 includes one or more communication buses for interconnecting these components. The one or more communication buses optionally include circuitry (sometimes called a chipset) that interconnects and controls communications between system components.

The storage device 808 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 808 can also be referred to as persistent memory. The pointing device 814 may be a mouse, track ball, or other type of pointing device, and is used in combination with the keyboard 810 to input data into the computer 800. The graphics adapter 812 displays images and other information on the display 818. The network adapter 816 couples the computer 800 to a local or wide area network.

The memory 806 holds instructions and data used by the processor 802. The memory 806 can be non-persistent memory, examples of which include high-speed random-access memory, such as DRAM, SRAM, DDR RAM, ROM, EEPROM, flash memory.

As is known in the art, a computer 800 can have different or other components than those shown in FIG. 8. In addition, the computer 800 can lack certain illustrated components. In one embodiment, a computer 800 acting as a server may lack a keyboard 810, pointing device 814, graphics adapter 812, or display 818. Moreover, the storage device 808 can be local or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, or software. In one embodiment, program modules are stored on the storage device 808, loaded into the memory 806, and executed by the processor 302.

Additional Considerations

The foregoing description of the embodiments has been presented for the purpose of illustration; it is not intended to be exhaustive or to limit the patent rights to the precise pages disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Furthermore, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. A non-transitory computer-readable storage medium storing instructions that, when executed by a computing system, cause the computing system to:

receive sensor data from one or more sensors of an augmented reality device;

determine a target location for a virtual object, wherein the target location for the virtual object comprises a real-world location that the augmented reality device targets the virtual object to appear to be located when viewed through a display of the augmented reality device;

display the virtual object at an original location to a user of the augmented reality device based on the target location and the received sensor data;

receive updated sensor data from the one or more sensors of the augmented reality device;

determine whether the target location is within an angular threshold of the original location based on the updated sensor data, wherein the angular threshold is a maximum angle by which a line from the augmented reality device to the virtual object can change within a timestep; and responsive to the target location being outside of the angular threshold of the original location, display the virtual object to the user at an updated location, wherein the updated location is within the angular threshold of the original location and is a closest location to the target location.

2. The computer-readable medium of claim 1, further storing instructions that cause a processor to determine, based on the updated sensor data, whether the original location of the virtual object is substantially similar to the target location.

3. The computer-readable medium of claim 1, wherein the one or more sensors comprise one or more of a movement sensor, an accelerometer, a gyroscope, an inertial measurement units, a barometer, a positioning system, a thermometer, or a light sensor.

4. The computer-readable medium of claim 1, further storing instructions that cause a processor to: responsive to the target location being within the angular threshold of the original location, display the virtual object to the user at the target location.

5. The computer-readable medium of claim 1, wherein the instructions for determining whether the target location is within an angular threshold of the original location comprises:
identifying a first sight line from a location of the augmented reality device to the original location;
identifying a second sight line from the location of the augmented reality device to the target location; and
determining whether an angle between the first sight line and the second sight line exceeds the angular threshold.

6. The computer-readable medium of claim 1, wherein displaying the virtual object to the user at an updated location comprises determining parameters of a first line that intersects the target location and intersects a second line at a right angle, wherein the second line corresponds to the angular threshold.

7. The computer-readable medium of claim 1, wherein displaying the virtual object to the user at an updated location comprises determining the updated location based on one or more trigonometric functions and the angular threshold.

8. The computer-readable medium of claim 1, wherein the updated location is a closest location to the target location that is within the angular threshold based on a Euclidean distance between the updated location and the targeted location.

9. The computer-readable medium of claim 1, wherein the augmented reality device comprises a smartphone.

10. The computer-readable medium of claim 1, wherein the augmented reality device comprises a headset.

11. A non-transitory computer-readable storage medium storing instructions that, when executed by a processor, cause the processor to:
receive sensor data from one or more sensors of an augmented reality device;

determine a target location for a virtual object, wherein the target location for the virtual object comprises a real-world location that the augmented reality device targets the virtual object to appear to be located when viewed through a display of the augmented reality device;

display the virtual object at an original location to a user of the augmented reality device based on the target location and the received sensor data;

receive updated sensor data from the one or more sensors of the augmented reality device;

determine whether the target location is within a motion threshold of the original location based on the updated sensor data, wherein the motion threshold is a maximum distance that a location of the virtual object can be adjusted from the original location to the target location, wherein the motion threshold is based on a motion of the virtual object; and responsive to the target location being outside of the motion threshold of the original location:
determine an updated location for the virtual object, wherein the updated location is within the motion threshold of the original location and is a closest location to the target location; and
update the virtual object based on the updated location.

12. The computer-readable medium of claim 11, further storing instructions that cause a processor to determine, based on the updated sensor data, whether the original location of the virtual object is substantially similar to the target location.

13. The computer-readable medium of claim 11, wherein the one or more sensors comprise one or more of a movement sensor, an accelerometer, a gyroscope, an inertial measurement units, a barometer, a positioning system, a thermometer, or a light sensor.

14. The computer-readable medium of claim 11, further storing instructions that cause a processor to: responsive to the target location being within the motion threshold of the original location, display the virtual object to the user at the target location.

15. The computer-readable medium of claim 11, wherein displaying the virtual object at the original location further comprises displaying the virtual object based on motion instructions for the virtual object, wherein the motion instructions comprise a direction of motion of the virtual object and a motion distance that the virtual object travels within a timestep.

16. The computer-readable medium of claim 15, wherein the motion threshold is based on the motion distance that the virtual object travels within a timestep.

17. The computer-readable medium of claim 15, further storing instructions that, when executed by a processor, cause the processor to display the virtual object at a next location based on the updated location and the motion instructions for the virtual object, wherein the next location is a location of the virtual object after the virtual object travels the motion distance in the direction of motion from the updated location.

18. The computer-readable medium of claim 17, wherein displaying the virtual object at the next location comprises moving the virtual object directly from the original location to the next location within one timestep.

19. The computer-readable medium of claim 17, wherein displaying the virtual object at the next location comprises:
displaying the virtual object at the updated location at a first timestep; and
displaying the virtual object at the next location at a second timestep subsequent to the first timestep.

20. The computer-readable medium of claim 11, wherein the augmented reality device comprises a smartphone.

21. A method comprising:
receiving sensor data from one or more sensors of an augmented reality device;
determining a target location for a virtual object, wherein the target location for the virtual object comprises a real-world location that the augmented reality device targets the virtual object to appear to be located when viewed through a display of the augmented reality device;
displaying the virtual object at an original location to a user of the augmented reality device based on the target location and the received sensor data;
receiving updated sensor data from the one or more sensors of the augmented reality device;
determining whether the target location is within an angular threshold of the original location based on the updated sensor data, wherein the angular threshold is a maximum angle by which a line from the augmented reality device to the virtual object can change within a timestep; and
responsive to the target location being outside of the angular threshold of the original location, displaying the virtual object to the user at an updated location, wherein the updated location is within the angular threshold of the original location and is a closest location to the target location.

22. The method of claim 21, further comprising determining, based on the updated sensor data, whether the original location of the virtual object is substantially similar to the target location.

23. The method of claim 21, wherein the one or more sensors comprise one or more of a movement sensor, an accelerometer, a gyroscope, an inertial measurement units, a barometer, a positioning system, a thermometer, or a light sensor.

24. The method of claim 21, further comprising: responsive to the target location being within the angular threshold of the original location, display the virtual object to the user at the target location.

25. The method of claim 21, wherein determining whether the target location is within an angular threshold of the original location comprises:
identifying a first sight line from a location of the augmented reality device to the original location;
identifying a second sight line from the location of the augmented reality device to the target location; and
determining whether an angle between the first sight line and the second sight line exceeds the angular threshold.

26. The method of claim 21, wherein displaying the virtual object to the user at an updated location comprises determining parameters of a first line that intersects the target location and intersects a second line at a right angle, wherein the second line corresponds to the angular threshold.

27. The method of claim 21, wherein displaying the virtual object to the user at an updated location comprises determining the updated location based on one or more trigonometric functions and the angular threshold.

28. The method of claim 21, wherein the updated location is a closest location to the target location that is within the angular threshold based on a Euclidean distance between the updated location and the targeted location.

29. The method of claim 21, wherein the augmented reality device comprises a smartphone.

30. The method of claim 21, wherein the augmented reality device comprises a headset.

31. A method comprising:
receiving sensor data from one or more sensors of an augmented reality device;
determining a target location for a virtual object, wherein the target location for the virtual object comprises a real-world location that the augmented reality device targets the virtual object to appear to be located when viewed through a display of the augmented reality device;
displaying the virtual object at an original location to a user of the augmented reality device based on the target location and the received sensor data;
receiving updated sensor data from the one or more sensors of the augmented reality device;
determining whether the target location is within a motion threshold of the original location based on the updated sensor data, wherein the motion threshold is a maximum distance that a location of the virtual object can be adjusted from the original location to the target location, wherein the motion threshold is based on a motion of the virtual object; and
responsive to the target location being outside of the motion threshold of the original location:
determining an updated location for the virtual object, wherein the updated location is within the motion threshold of the original location and is a closest location to the target location; and
updating the virtual object based on the updated location.

32. The method of claim 31, further comprising determining, based on the updated sensor data, whether the original location of the virtual object is substantially similar to the target location.

33. The method of claim 31, wherein the one or more sensors comprise one or more of a movement sensor, an accelerometer, a gyroscope, an inertial measurement units, a barometer, a positioning system, a thermometer, or a light sensor.

34. The method of claim 31, further comprising: responsive to the target location being within the motion threshold of the original location, display the virtual object to the user at the target location.

35. The method of claim 31, wherein displaying the virtual object at the original location further comprises displaying the virtual object based on motion instructions for the virtual object, wherein the motion instructions comprise a direction of motion of the virtual object and a motion distance that the virtual object travels within a timestep.

36. The method of claim 35, wherein the motion threshold is based on the motion distance that the virtual object travels within a timestep.

37. The method of claim 35, further comprising displaying the virtual object at a next location based on the updated location and the motion instructions for the virtual object, wherein the next location is a location of the virtual object after the virtual object travels the motion distance in the direction of motion from the updated location.

38. The method of claim 37, wherein displaying the virtual object at the next location comprises moving the virtual object directly from the original location to the next location within one timestep.

39. The method of claim 37, wherein displaying the virtual object at the next location comprises:
displaying the virtual object at the updated location at a first timestep; and
displaying the virtual object at the next location at a second timestep subsequent to the first timestep.

40. The method of claim 31, wherein the augmented reality device comprises a smartphone.

* * * * *